May 2, 1944.  W. A. SMITH ET AL  2,348,157
RADIO INTERFERENCE TESTING MACHINE
Filed Feb. 5, 1942  4 Sheets-Sheet 1

Inventor
WILLIAM A. SMITH
CHARLES J. MILLER JR.
By Alfred F. Rees
Attorney

May 2, 1944.   W. A. SMITH ET AL   2,348,157
RADIO INTERFERENCE TESTING MACHINE
Filed Feb. 5, 1942   4 Sheets-Sheet 2

Inventor
WILLIAM A. SMITH
CHARLES J. MILLER JR.
By
Attorney

May 2, 1944.  W. A. SMITH ET AL  2,348,157
RADIO INTERFERENCE TESTING MACHINE
Filed Feb. 5, 1942  4 Sheets-Sheet 3

FIG. 4.

Inventor
WILLIAM A. SMITH
CHARLES J. MILLER JR.
By
Alfred F. Dees
Attorney

Inventor
WILLIAM A. SMITH
CHARLES J. MILLER JR.
By
Attorney

Patented May 2, 1944

2,348,157

UNITED STATES PATENT OFFICE 2,348,157

RADIO INTERFERENCE TESTING MACHINE

William A. Smith and Charles J. Miller, Jr., Barberton, Ohio, assignors to The Ohio Brass Company, Mansfield, Ohio, a corporation of New Jersey Application February 5, 1942, Serial No. 429,704

21 Claims. (Cl. 175—183)

This invention relates to a testing machine and in its more specific aspects is concerned with a machine for rapidly testing high voltage insulators to determine their ability to suppress or minimize their inteference with radio broadcast reception.

The object of this invention is to provide a device which will rapidly and accurately determine the radio influence voltage of an insulator and its ability to minimize or prevent radio broadcast interference.

A further object of the invention is to provide a test mechanism that will apply a predetermined difference of potential across an insulator to determine its radio interference quality.

Another object of the invention is to provide a testing machine that will successively impose a predetermined difference of potential on each one of a series of insulators to rapidly determine whether any or all of them are suitable for commercial use as insulators in which no objectionable radio disturbance will be generated.

A still further object of the invention is to provide a testing machine which includes mechanism that will prevent the application of power to the test terminals thereof when no test piece is disposed between the terminals.

A still further object of the invention is to provide both a visual and audible signal in a testing machine to quickly inform the operator whether a given test piece has met a predetermined standard.

Another and still further object of the invention is to provide a testing machine in which the work piece under test is shielded from outside disturbances while undergoing test.

Another and still further object of the invention is to provide a testing mechanism and circuit arranged such that the testing circuit will be fully de-energized before the succeeding indexing operation is initiated.

Another and a still further object of the invention is to provide a testing device in which the voltage to be applied to a test piece is capable of variation and in which mechanism is provided for selectively applying same to a work piece under test and which also incorporates protective mechanism to prevent the application of such voltage except at predetermined and selected intervals.

Another and still further object of the invention is to provide a testing machine with an indexable table having a plurality of work holders thereon in which insulators are held and each of which is successively presented to the electrode or contact mechanism of a high voltage circuit that is successively applied to each test piece as it is indexed under the said contact mechanism such that each test insulator may be subjected to a high voltage.

Other and further objects of the invention are to increase the speed and efficiency of the test, to effect a speedier determination of defective insulators, to speed manufacturing and construction operations by eliminating defective insulators thereby reducing cost of manufacture and to make possible the testing of the devices by unskilled labor thereby materially reducing the cost of inspection.

Other and further objects of the invention will occur to those skilled in the arts to which this invention pertains which taken in connection with the accompanying drawing sets forth the preferred embodiment thereof, but such disclosure is not to be construed as a limitation of the invention, which is limited only by the appended claims, and any and all modifications and alterations of structure coming within the spirit and scope thereof are deemed to be included herein.

The current widespread use of A. C. radio broadcast receivers has imposed upon high tension transmission lines the duty of not only delivering an uninterrupted flow of power at a predetermined voltage and frequency but has in addition required that it provide the average household with a power supply, by reason of such receiver, that is reasonably free of radio interference produced in or caused by the transmitting and generating equipment. The elimination of such radio noises generated in and by rotating equipment has received a solution of one character but that produced by line equipment did not lend itself to such a simple solution. The latter difficulties were not materially reduced until the design of certain types of insulators were materially altered and constructed in such a way that under normal operating conditions they do not generate electro-magnetic disturbances which interfere with radio broadcast reception. In view of the fact that an insulator which does not have adequate radio proofing characteristics may nullify the radio proofing efficiency of an entire group, it is desirable that all individual units assembled therein have a test applied to them that will quickly determine their radio interference characteristics. This test requires the application to the insulator of a predetermined difference of potential and the measurement of the radio interference thereby generated.

The instant invention is directed to a device which periodically brings a test insulator under a vertically movable electrode or contact mechanism that is applied thereto and then subjecting the insulator to a high predetermined potential. Means are provided for measuring the radio influence voltage in microvolts and coupled therewith are visual and audible signaling means to inform the operator of the results of the test. The time required for making the test is very short, and by employing a periodically indexable work supporting mechanism, the test has been reduced to the simple function of replacing tested insulators with untested ones in the work holders and observing the test results. Various other features are incorporated which will be set forth in extenso as the description proceeds.

The embodiment of the above ideas is set forth in the attached drawings in which 1 is the base of the machine which supports the rotating and other periodically moving equipment. The base 1 supports a central column 2 rigidly held in a double boss 3 integrally associated with an auxiliary base element 4 bolted or otherwise secured to the base 1. The column 2 supports a work supporting table 5 for an indexable rotation. The table 5 is vertically slidably mounted on a sleeve 6 rotatably disposed on column 2 and supported thereon in bearings 7 and 8, the former of which is shown as a plain sleeve bearing and the latter of which is preferably an anti-friction bearing. The sleeve 6 is threaded over a portion of its length on its lower end which portion is engaged by a nut 9 engaging with the table 5 for the purpose of vertically adjusting the same on the sleeve 6. The nut 9 may be locked in position if so desired. The nut 9 engages the table 5 through the medium of a sleeve 10 having a pair of slide bearings 11 and 12 disposed therein to assist the vertical motion of the table. The lower bearing 12 has a key 13 held therein by means of screw 14 that engages a key slot 15 to prevent relative rotation of table 5 and sleeve 6.

Figures 1, 5:
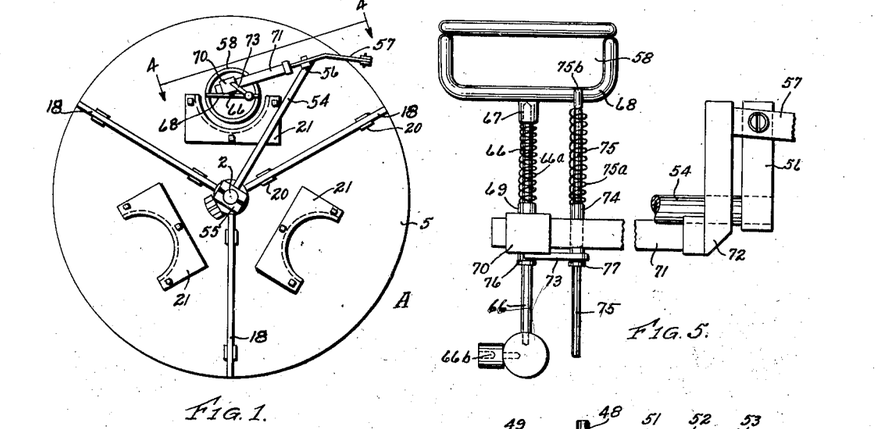
Fig. 1 is a plan view of the rotating table and associated mechanism.
Fig. 5 shows an enlarged inverted view, taken in the direction of line 4—4 of Fig. 1, of one of the electrodes of the testing machine and a portion of the operating mechanism thereof.
Figures 2, 6:
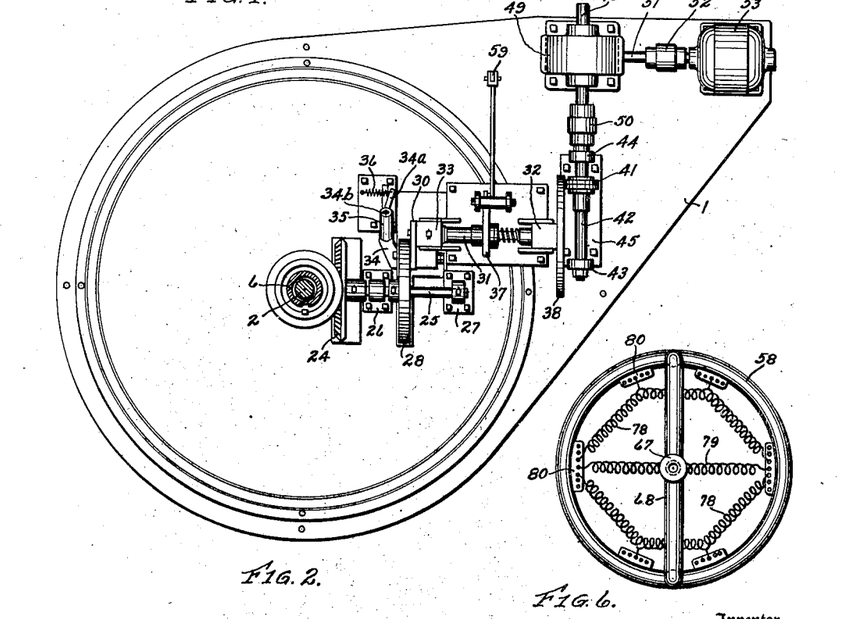
Fig. 2 is a plan view of the operating mechanism for the table and its supporting base.
Fig. 6 shows a bottom plan view of the electrode of Fig. 5 but with the contacts assembled therein.
Figures 3, 3A:
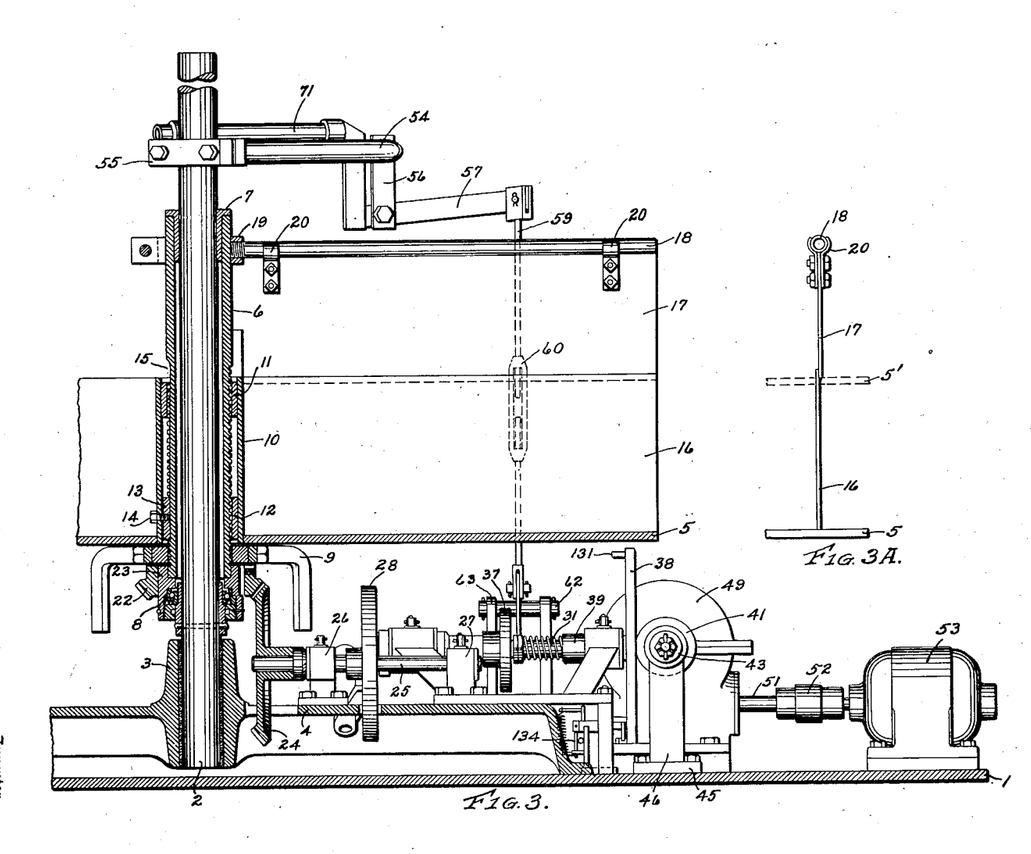
Fig. 3 is an elevational view of a portion of the testing machine partly in section to show details of construction.
Fig. 3a shows an elevational view of the dividing baffles shown in Fig. 3.
Figure 4:
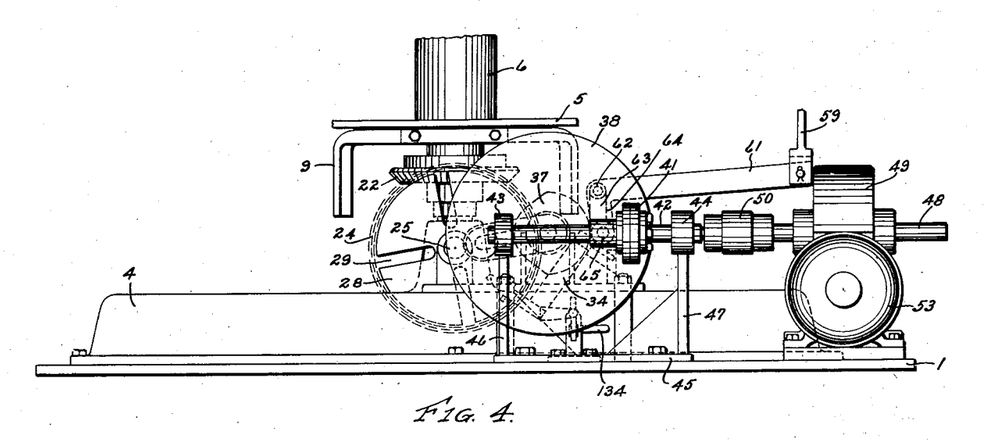
Fig. 4 shows a side elevational view of the transmission looking from the right in Fig. 3.

The table 5 is further provided with a plurality of baffles 16 which are radially disposed thereon to divide the table surface into a number of equal sections and above the table baffles is another series of baffle plates 17, 17, 17 that are each suspended from a support 18 rigidly secured in an element 19 fixed to sleeve 6. One or more clip elements 20 positively associate each baffle 17 with its individual support 18. The table 5 is adjusted vertically substantially between the limits of the full line position shown in Fig. 3a to the dotted line position 5' in the same figure and the baffles 16 and 17 slide relatively vertically of each other as the table 5 is vertically adjusted. A work piece holder 21 is disposed on the table between each of the several baffle plates 16, 17, etc. It is evident therefore that as the table is rotated or indexed that each of the baffles will move along with it successively bringing each work piece holder to the working station of the device. The object of the vertical adjustment is to accommodate the various sizes of insulators.

Rigidly secured to sleeve 6 at its lower end is a bevel gear 22 that is keyed to a differential sleeve 23 rigidly associated with sleeve 6 and housing bearing 8 supporting sleeve 6 at its lower end. A grease or lubricant retainer of conventional design is disposed in the lower end of the sleeve 23 and the entire assemblage is rotatably supported on column 2.

Rotation is imparted to the sleeve 6 and bevel gear 22 from the transmission mounted on the base 1 which terminates in a bevel gear 24 that meshes with the bevel gear 22. Gear 24 is rigidly secured to a shaft 25 rotatably supported in appropriate bearings 26 and 27. Mounted on the same shaft is a Geneva wheel 28 adapted to periodically index the table 5, said Geneva wheel being of conventional design. Geneva wheel 28 has four tracks 29 therein and since table 5 has three work positions, the gears 22 and 24 must be proportioned in a 4 to 3 ratio.

The crank arm or cam element engageable with one of the tracks 29 comprises an arm 30 fixed to shaft 31 rotatably supported in bearings 32 and 33. Means have, also, been provided in the form of a pivoted arm 34 rotatably supported on a bracket element 35 to hold the Geneva wheel 28 in position during the time the crank 30 is not engaged in rotating it. Arm 34 engages in one of the tracks 29 and is urged into engagement therewith by spring 36 secured to a lever 34a on the shaft 34b carrying arm 34. The arm 34 will normally hold 28 stationary but when urged forward by the crank will cause 34 to unseat. This mechanism functions to all intents and purposes as a spring pressed detent.

The shaft 31 upon rotation will also raise and lower an electrode or contact mechanism hereinafter set forth which means comprises a cam wheel 37 fixed to the shaft 31 and at the right-hand outer end of shaft 31 a second cam wheel 38 is mounted thereon which is adapted to open and close the energizing circuit to be subsequently set forth and which also frictionally receives motive power from a prime mover element. The cam wheel 38 is preferably splined (not shown) to shaft 31 through an appropriate sleeve 39 fixed thereto and is urged to the right against a friction wheel 41 which is intended to rotate the said cam wheel 38.

The friction wheel 41, which is preferably of some leather or composition material, is fixed to a shaft 42 rotatably supported in bearings 43 and 44 fixed to a supporting plate or bracket 45 secured to base 1, the bearings being arranged on appropriate pedestals 46 and 47 on said bracket.

Coaxially arranged with shaft 42 is another shaft 48 associated with the output side of a speed changer set 49 and connected thereto by means of a flexible coupling 50. Power is introduced to the speed changer set 49 by input shaft 51 connected by coupling 52 to the armature shaft of motor 53 which serves as the prime mover for the transmission.

It should be apparent from the foregoing that table 5 is periodically indexed to successively present work holders 21 under the electrode for engaging a work piece carried thereby and that the speed and rate of indexing is a function of speed changer set 49, friction drive 41, 38 and gears 22, 24 each of which upon variation is capable of influencing the speed and frequency of indexing.

The machine has an electrode operated in connection with the table 5 that is applied to an insulator under test in a timed relation such that the said electrode is in its elevated position during the time that the table 5 is undergoing an indexing operation. This structure originates in a supporting arm 54 rigidly clamped to the column 2 near its upper end by means of clamp 55 which also enables the vertical adjustment of the arm on the column 2. Suspended from the arm 54 is a supporting member 56 swingably secured thereto. Pivotally mounted on the member 56 is another arm 57 which has the electrode 58 mounted thereon and on the other end there is a vertical lever 59 pivotally secured thereto having a turnbuckle 60 therein to adjust the length thereof. The lever 59 is pivotally connected to one arm 61 of a bell crank lever that is pivoted at 62 to an appropriate bracket 63 secured to the base 4 and the other arm 64 of the bell crank has a roller 65 mounted thereon that engages with the cam wheel 37. This cam is so proportioned that it will hold the electrode 58 in its uppermost position when the Geneva wheel 28 is rotated during the indexing of the table 5 and the parts supported thereon.

The electrode or contact mechanism 58 is mounted on a rod member 66 threaded into an appropriate boss 67 integral with bridging element 68 of the electrode 58. Rod 66 is slidably mounted in sleeve 69 whose bore is transverse to the principal bore in sleeve 70 to which it is secured. The sleeve 70 is mounted on a tubular element 71 made of a non-conducting material rigidly fixed to an adapter 72 associated with the arm 57. The sleeve 70 has a wing 73 thereon which supports a sleeve 74 receiving a rod 75. The conductor for charging the electrode is connected to rod 66 by means of connector 66b. Rods 66 and 75 have stop mmebers 76 and 77 thereon which engage with the sleeves 69 and 74 to limit the relative movement of rods 66 and 75 with respect to tube 71 and to lift the electrode from the insulator under test. The general object of the sliding motion of rods 66 and 75 is to permit the resilient contacts later described to firmly yet resiliently engage the insulator under test.

The electrode 58 is urged against the test insulator under the influence of spring 66a and 75a and to bring and hold it in contact with said test insulator mounted on table 5. As indicated above this motion is limited by stop collars 76 and 77. Rod 75 is forked at 75b to prevent relative rotation of electrode and rod 75. The springs 66a and 75a are disposed respectively between the elements 67 and 69 and 75b and 74.

The contact elements of the electrode or contact mechanism 58 comprises a series of springs 78 that are disposed internally about the circumference of the ring of the electrode 58. There is also a diametrically disposed spring 79. Each of these springs is secured to a plurality of bracket elements 80 having a plurality of holes therein such that the springs may be adjusted for different sizes of insulators. Electrical contact of spring elements 78 and 79 through the ring of electrode 58, element 68, thence through boss 67, rod 66 and by means of connector 66b which receives a conductor subsequently described conducts current to the test piece. The instant arrangement is intended for pin type insulators and other types of insulators require different forms of contact elements. The particular form of contact is left to the discretion of the operator since the form of insulator determines the type of contact element. From the foregoing it is clear that the contacts are positively yet resiliently applied to the test insulator and that sufficient yield is present to avoid any undue strain on the several rigid parts.

Figure 7:
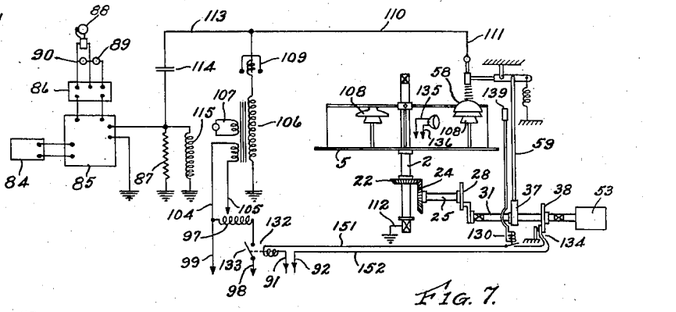
Fig. 7 shows the connection between the mechanical and electrical apparatus of the testing machine.
Figure 8:
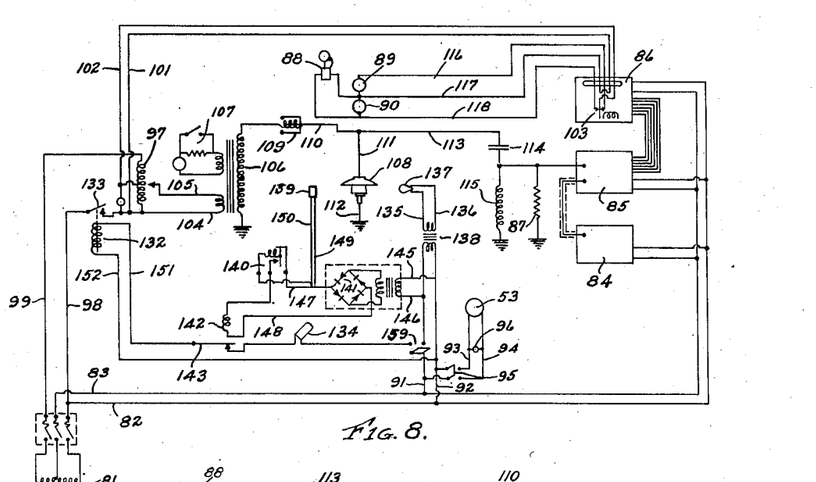
Fig. 8 shows the fundamental testing circuit.

The potential for operating the several controls originates in an appropriate power supply source which in Fig. 8 happens to be a 440 volt, 60 cycle supply stepped down to 220 volts and 110 volts by means of transformer 81 although this element is by no means essential to the operation of the device because the values chosen are purely arbitrary. Fig. 8 shows the comprehensive electrical circuit and Fig. 7 shows specifically the tie-up between the indexing mechanism and the circuit for imposing a desired high potential or voltage on the insulator test piece 108.

One part of the circuit, the 110 volt, comprising conductors 82 and 83 supplies the energizing current for the several controls and the motor 53. The first of these controls is calibrator 84, which provides signals of known frequency and magnitude for the purpose of adjusting radio noise meter 85 which reads in terms of microvolts the radio interference voltage across resistance 87. 86 is the control panel which receives the calibrated or measured signal from meter 85 and translates these signals into sound by an appropriate loud speaker (not shown) and also into audible signal 88 and light signals 89, 89' and 90, 90' whereby an operator may both hear and see the results of the test.

The motor 53 is energized from the supply lines 82 and 83 by means of conductors 91, 92, 93 and 94 arranged as shown with the switch 95 interposed for the purpose of controlling motor 53. A signal light 96 is provided to show whether or not the motor circuit has been energized.

The 220 volt taps of supply 81 are connected to a variable voltage control or auto-transformer 97 by means of conductors 98 and 99. The transformer 97 is tapped at one point for 110 volts to provide current to selectively energize the signals 88, 89, 89', 90 and 90' by means of conductors 101 and 102. The functioning of switch 103 to apply selectively the current available in conductors 101 and 102 to the several signals will be subsequently set forth.

The secondary taps 104 and 105 of the transformer 97 are connected directly to the primary of test transformer 106. The test transformer is also supplied with a voltmeter circuit 107 in order to obtain the value of the potential imposed on the insulator test piece.

The secondary of the test transformer 106 which is preferably one capable of producing a voltage of from 0–60,000 volts is imposed directly on the insulator test piece 108 through a shielded radio-frequency choke coil 109 interposed in the conductor 110 and thence connected to the test piece 108 through conductor 111 and thence by conductor 112 is connected through the framework of the machine to the ground. Since one side of the secondary of transformer is grounded, as shown, a complete energizing circuit is established when the electrode 58 is in contact with a test piece 108.

The high frequency disturbances originating across the test insulator under normal circumstances are generally measured in micro-volts and as previously indicated are interpreted in terms of light and sound signals. This voltage drop is not measured directly across the test piece 108 but is measured across a known resistance 87 which is connected thereto by conductor 113 with condenser 114 interposed. The voltage drop across 87 is therefore in direct proportion to the drop across 108 and is measured in microvolts. A 60-cycle drain coil 115 is disposed in parallel with resistance 87 to reduce the 60-cycle potential across resistance 87 to a few volts and to prevent damage to the measuring equipment in case resistance 87 is burned out or is accidentally disconnected.

The high frequency disturbance established across the resistance 87 is evaluated by noise meter 85 which has been calibrated against a signal of known magnitude from 84. The output of noise meter 85 is impressed on the interpreting device 86 which controls audible signal 88 and visible signals 89, 89', 90 and 90'.

Figure 9:
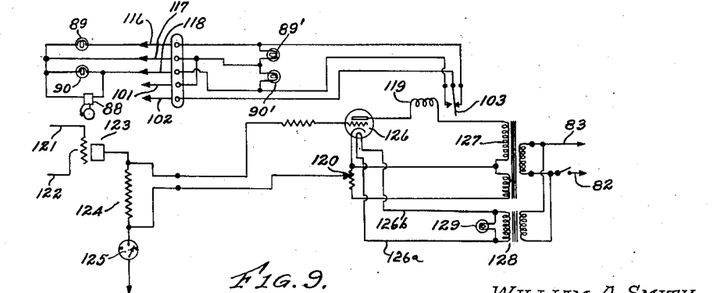
Fig. 9 shows the detailed signal circuit for the testing machine.

The audible signal 88 and visible signals 89, 89', 90 and 90', as set forth above are controlled by the interpreting device 86, the details of which are revealed in Fig. 9. Conductors 121 and 122 connect the input circuit of a triode vacuum tube 123 in parallel with the output impedance element of the diode detector of radio noise meter 85, said impedance element consisting of a condenser and resistance in parallel, so proportioned that the discharge time constant of the combination is in the order of 600 milliseconds. The net result of this arrangement is to provide across the input circuit of tube 123 a direct current potential, the magnitude of which is proportional to the magnitude of the high frequency disturbances appearing across the test insulator 108 when energized to a given test voltage by transformer 106.

The plate circuit of tube 123 includes a resistance 124, a direct current milliammeter 125 and a direct current power supply (not shown) the magnitude of which is adjustable. With zero input to the terminals of radio noise meter 85, the magnitude of the said direct current power supply is adjusted to give milliammeter 125 a full-scale deflection. The scale of meter 125 has been divided into two equal segments; the segment between zero and half-scale deflection has been colored red and the other segment, between half-scale and full-scale deflection, has been colored green, not indicated as such in the drawings. The midscale point has been marked "radio test level" and the full-scale point has been marked 0 radio noise. This corresponds to the above described adjustment wherein meter 125 has a full scale deflection for zero input to radio noise meter 85. As described above, for any input signal to radio noise meter 85, there will be a direct current potential applied to the input circuit of tube 123. The polarity of this direct current potential is such as to increase the negative bias on the grid of 123 which thereby decreases the plate current flowing through meter 125 and resistance 124. For any given input signal to meter 85, it is possible, by adjusting the gain control thereof, to adjust the deflection of meter 125 to half-scale deflection, which as mentioned above is marked "radio test level." By making the input signal to meter 85 an arbitrary test level, the needle of meter 125 will be at the "radio test level" when the insulator under test is generating a radio disturbance which just equals the said arbitrary test level. This arrangement provides the means for determining the radio-proofing quality of any insulator placed in the test position. With the proper test voltage applied across the insulator the magnitude of the radio disturbance generated is immediately evident by observing the position of the needle of meter 125. If it stays opposite the green segment, the insulator is generating a disturbance the magnitude of which is less than a given arbitrary test level; if it swings into a position opposite the red segment, it is generating a disturbance in excess of the arbitrary test level.

The purpose of audible signal 88 and visible signals 89, 89', 90 and 90' is to supplement the indications of meter 125 so that the operator will not have to watch it to determine the results of the test.

The grid of a gas-filled triode 126 is connected by means of lead 124a to one end of resistance 124, the other end of which is connected to the cathode of tube 124 through a section of potentiometer 120 which is connected across a secondary winding of transformer 127, the primary of which receives power through leads 82 and 83. The plate circuit of tube 126 includes relay coil 119, which controls the switch contacts 103, and a secondary winding of transformer 127. Thus, an alternating current voltage is applied to the plate circuit of tube 126. The bias applied to the grid of tube 126 consists of an alternating current component, obtained from the section of potentiometer 120 included in the grid circuit, and a direct current component obtained from the voltage drop across resistance 124 caused by the direct current flowing therein. The direction of current flow through resistance 124 is such that a negative direct current bias is provided at the grid of tube 126. By moving the adjustable arm of potentiometer 120 the magnitude of the alternating current component of the grid bias may be adjusted so that the gas-filled triode 126 will fire when the current flow through resistance 124 gives a mid-scale deflection of the needle of meter 125, which, as described above, places the needle opposite the "radio test level" mark. The bias of tube 126 is therefore adjusted so that when the needle of meter 125 is opposite the green segment the tube does not fire. However, as the needle swings towards the red segment, the direct current bias decreases and when the needle reaches the "radio test level" mark, the tube fires and continues to fire as long as the needle remains opposite the red segment.

Before tube 126 fires, the contacts 103 remain in the position shown in Fig. 9. Visible signals 89 and 89', which are in reality 110-volt lamps behind a green glass, are lighted whenever power is supplied through leads 101 and 102, which in turn get power from transformer 97 whenever it is energized by the closing of switch 133. Since closing switch 133 also energizes transformer 106 and insulator 108, visual signals 89 and 89' are illuminated only when voltage is being applied to the insulator under test. When tube 126 fires it energizes relay coil 119, thereby switching the power supplied by leads 101 and 102 from visible signals 89 and 89' to 90 and 90' and also to audible signal 88. Visible signals 90 and 90' are in reality 110-volt lamps behind red glass and audible signal 88 is an electric bell. Since the firing of tube 126 occurs only when the radio disturbance generated by the insulator exceeds a given arbitrary test level, the red lights and the electric bell indicate to the operator that the insulator under test does not meet the said test level.

The net result achieved by this arrangement is the establishment of a signal system which grades the insulators tested into two groups, one of which includes units which meet an arbitrary set of conditions and the other includes units which fail to meet them. In other words, the device operates essentially like a go not-go gage.

The safety measure or expedient incorporated in the testing device makes provision to avoid energizing the previously described high tension circuit in the event that there is no work or test piece 108 in position on the work table 5 underneath contact mechanism or electrode 58 or if for some reason there is a failure on the part of the work table not to have been properly positioned. In other words, it is necessary that a work piece be in position underneath the electrode 58 and that it be in position to engage with the work piece directly underneath it. There are two separate devices included in this machine that assure the operator that everything is in proper operating condition before the high potential can be applied to the test piece.

Cam 38 has two arms 131 thereon, only one of which is shown, that are adapted to open and close a mercury switch 134 located on the base 1 of the machine. This switch is adapted to open and close the circuit originating in conductors 91 and 92 including conductors 151, 152 and coil 132 that energizes a coil 132 intended to close a switch 133 in the primary of auto-transformer 97 which, as previously described, energizes the test transformer 106. The cam 38 is rigidly connected to the shaft 31 driving the crank arm 30 that operates the index or Geneva wheel 28 therefor that synchronizes the energizing of the test transformer with the cam 37 when the electrode 58 has come into engagement with the work piece. It is obvious, therefore, that no potential will be applied to the insulator until cam wheel 38 has closed the switch 134.

The other feature of the safety device includes a means for preventing the high potential to be applied in the event a work piece is not present in one of the holders 21 even though the cam wheel 38 and one of its projections 131 has closed the switch 134. As schematically represented in Fig. 7, a switch 143 (Fig. 8) actuated from photoelectric cell 139 energized from light 137 is opened in the absence of a work piece, the switch 130 of Fig. 7, corresponding to 143 in Fig. 8, will open the circuit to switch 133 and its operating coil 132, as previously described. The switch 130 and its operation is more specifically detailed in Fig. 8 where it correspondingly appears as switch element 143.

Upon the closing of switch 159, the circuit to transformer 138 including the conductors 91 and 92 is closed which energizes the secondary of the transformer 138 and illuminating the light 137. Diametrically disposed to the work test piece 108 is the photoelectric cell 139, as previously described, and it is activated by light rays coming from light 137 in the event that there is no work piece underneath the electrode 58. The opening of normally closed relay 143 in Fig. 8 is initiated by light from 137 striking photoelectric cell 139 whenever it is not intercepted by an insulator under test. Current generated in cell 139 by said light closes the contacts of relay 140. This circuit includes photoelectric cell 139, conductors 149 and 150 and conductor 147; conductor 150 extends to one of the contacts of 140. When relay 140 is energized the movable element thereof closes an energizing circuit to the relay 142 which derives its source of energy from rectifier 141 and the circuit thereof includes relay coil 142, conductors 147 and 148 and rectifier 141. Rectifier 141 is supplied from a transformer connected to conductors 91 and 92 by conductors 145 and 146. Rectifier 141 generates a low voltage supply, preferably six volts direct current, that is used to energize relay 142 to open switch 143. Therefore, when no work piece is present or in position, light 137 and its cooperating cell 139 will prevent the closure of switch 133 by opening the energizing circuit by means of switch 143. Relay 140 is an extremely sensitive element requiring only a very feeble current to actuate same. In view of the physical proportion thereof necessary to make it operate on a feeble current it is not able to handle currents such as normally flow in conductors 151 and 152 and in coil 132. Therefore, the second relay 142 and its energizing source 141 are provided. This entire mechanism is schematically shown in Fig. 7 as switch 130 for the purpose of demonstrating the relationship of the shaft 31 to the operating circuit.

Light for energizing lamp 137 is derived from a transformer 138 connected to supply conductors 82 and 83 by conductors 91 and 92 and controlled by switch 159. Conductors 135 and 136 connect lamp 137 to 138. Lamp 137 could be, if so desired, connected directly to conductors 91 and 92.

The overall operation of the testing device includes the step of arranging an insulator 108 to be tested in support 21 at the operator's station A. The test machine is provided with a metallic canopy or enclosure (not shown) so shaped that the insulator under test 108, is enclosed and only that portion of the table 5 extending between two adjacent baffles is enclosed. The canopy is not shown in this disclosure and the adjacent baffles between which the insulator 108 is arranged provide the radio shielding of the insulator under test. The operator then closes switch 95 that starts the rotation of the motor 53 whose rotation is imparted to the shaft 31 through the mechanism previously described whereupon crank arm 30 engages in one of the slots in Geneva wheel 28 thereby rotating the work table 5 through 120 degrees of rotation which brings another work holder 21 to the station A. When shaft 31 has again imposed 120 degrees rotation on the table 5, the third work holder element 21 is brought to the operator's station A and the first work piece that has been loaded into the device is then brought underneath the electrode or contact mechanism 58. Upon completion of the indexing movement of table 5, bringing it to rest and locking it in that position by means of the lock mechanism 34, the cam has been rotating in a timed relationship to the crank arm 30 such that contact mechanism 58 will start its downward movement to engage test piece 108 after the table 5 has been brought to rest, as previously described. As soon as the contact mechanism or electrode 58 is snugly seated on the test piece 108, cam 38 has been rotated such that one of its switching engaging arms 131 has closed switch 134 that closes the circuit to coil 132 thereby closing switch 133 and closing the energizing circuit to high voltage transformer 106. The completion of this operation imposes the high test voltage across the test piece 108 and enables the metering and signaling devices previously described to measure the radio influence voltage of the test piece. Shaft 31 is continuously operated and under normal circumstances its rate of rotation is such that the aforementioned measuring operations have come into play before the second switching engaging arm 131 thereon has rotated to the point where it will open switch 134 deenergizing test transformer 106 and as soon as this has been completed the cam 37 has rotated to the point where it begins to lift contact mechanism 58 from the test piece to its elevated position and as soon as that has occurred, contact or crank arm 30 engages in another of the tracks 29 in Geneva wheel 28 to index the table 5 another 120 degrees and repeating the operation just described whereupon the operator removes the test piece that has just been subjected to the high potential and replaces it with another and thence repeating the operation. In the event that the operator is unable to replace the untested insulator in the work holder 21 its absence will not interfere with the sequence of operations just described and the presence of the photo-electric cell and the light means 137 will prevent the application of the high potential to the electrode or contact mechanism 58 by reason of the safety circuit previously described.

It is apparent that the transmission mechanism just described provides a continuously operating test device which periodically and successively presents each of the work holders 21 on the table 5 and the insulator it holds to the action of the highest voltage transformer 106 in a continuous operation that requires no other attention from the operator save that of replacing the tested insulator with an untested one and observing the test results indicated on the output meter 125 or by the lights 89 or 90 and sound signal 88.

From the foregoing it is apparent that the mechanism described provides a method for successively presenting a plurality of insulators to a source of high potential voltage and that provides a means for initiating high frequency disturbances and measuring them and, also, including means for interpreting the radio influence voltage across the resistance 87 in terms of visual and audible signals. As previously indicated, if the radio influence voltage drop across the resistance exceeds a given arbitrary value, the audible signal 88 and red signal 90 will be energized thereby informing the operator of the unsatisfactory radio influence characteristics of the insulator under test. The device provides a quick, accurate determination of the radio noise characteristics of an insulator.

That which is regarded new, novel and useful and which is sought to be protected by Letters Patent of the United States is as follows:

1. In a testing machine; a work table having a plurality of work stations thereon; means to index said table; a vertically movable electrode above said table; means to vertically move said electrode in timed relation to said table; circuit means to apply a high potential to a work piece on said table; a switch to close said circuit; means to close said switch operating in timed relation with said indexing means and said electrode moving means; light sensitive means to open said circuit in response to a predetermined condition of said work station; and means to measure the radio influence voltage of said work piece when said high potential is applied thereto.

2. In a testing machine; a table having a plurality of work stations thereon; an electrode movable at right angles to the plane of the table and adapted to engage a work piece carried in one of said work stations; a test circuit including said electrode and work piece; a switch to close said circuit; light sensitive means to open said circuit in response to a predetermined condition of said work station; a driven shaft having means thereon to index said table, other means on said shaft to move said electrode and still other means thereon to actuate said switch; each of said means being so arranged that said indexing is completed before said electrode is moved into engagement with said work piece and before said switch is closed; and means to inform the operator of the operating characteristics of said work piece.

3. In a testing machine; a work table having a plurality of isolated work stations thereon; an electrode movable toward and away from said table to bring it into engagement with a work piece arranged in one of said stations; a circuit for applying a high potential to said electrode including a transformer and a switch; a driven Geneva wheel shaft to index said table; a power driven cam shaft; a first means on said cam shaft to drive said Geneva wheel, a second means on said cam shaft to move said electrode; and a third means on said cam shaft to close said switch; and light sensitive means to open said circuit in response to a predetermined condition of one of said work stations.

4. In a testing machine; a work table having a plurality of work holders thereon; an electrode movable toward and away from a work piece fixed in said holders; means to apply a high voltage to said work piece which includes a transformer and a switch in the circuit of said transformer; a Geneva wheel to successively present said work holders under said electrode; a power driven shaft having means thereon to periodically rotate said wheel to index said table; a cam on said shaft to move said electrode toward and away from a selected work holder; means on said shaft to open and close said switch; said indexing being completed before said electrode is applied to a work piece in said work holders; means to measure the voltage drop across said work piece and light sensitive means responsive to an empty work holder being presented under said electrode to open said transformer circuit.

5. In an insulator testing machine; a vertically adjustable indexable work table; said table having a plurality of spaced work holders thereon; radially disposed elements vertically adjustable relatively of each other on said table segregating each of said work holders; an electrode vertically movable with respect to said table to be applied to each work piece arranged in each of said holders as it is successively brought under said electrode; a test transformer whose secondary circuit includes a work piece arranged in one of said holders when said work piece is in line with and is engaged by said electrode and a switch in the primary thereof; a power driven transmission to index said work table and vertically move said electrode and including means to open and close said switch; and means to measure the voltage drop across the test piece when said secondary circuit has been closed.

6. In an insulator testing machine; a work table having a plurality of work holders thereon, said work holders uniformly spaced thereon; means on said table radially disposed between said work holders to segregate same; a column secured in a base supporting said table for indexing movement; other radially disposed means supported on said column and disposed in cooperative relation to said table mounted means; means on said column to support a vertically movable electrode above one of said work holders; means on said column to vertically adjust said table; a high voltage transformer, the secondary circuit of which includes a work piece arranged in one of said work holders when said work piece is in line with and is engaged by said electrode; a switch in the primary circuit of said transformer; a power driven transmission, including means to index said table, means to vertically move said electrode and means to open and close said switch to selectively present each work holder under said electrode and apply same to a work piece in said holder and apply said high voltage to said work piece, and means to measure the voltage drop across a work piece.

7. In a safety device for a testing machine; an indexable table having a plurality of work piece holders thereon; a photoelectric cell disposed on one side of said work piece held in said holders; a source of light diametrically disposed to said cell with respect to said work piece; a source of high potential adapted to be imposed across said work piece; means to induce said high potential including a switch in the circuit thereof; means to energize said photoelectric cell and switch means to open said circuit controlled by said photoelectric cell; said source of light impinging on said cell to open said circuit when no work piece is under test while said table is indexing and preventing the energizing of said high potential means.

8. In an insulator testing machine; an indexable table having a plurality of work holders thereon for supporting a plurality of insulators; means to successively apply an electrode to a selected insulator as they are successively indexed under said electrode; radially disposed means on said table extending between each of said holders, other radial means on said table juxtaposed to said first radial means and adjustable relatively thereto, said means electrically isolating each holder and insulator from the effects of stray currents; means to apply a high potential to said insulator under test; means to measure the radio influence voltage of said insulator; and means to signal when said influence voltage is high and when it is low; each of said means being operated in a timed relation to each other.

9. In a radio interference testing machine; a base; a column supported on said base; a work table supported on said column; means to vertically adjust said table on said column; a plurality of shields radially spaced on said table and a plurality of shields suspended from said column; said shields slidable relative to each other; an insulator support arranged on said table between each of said shields; an electrode supporting mechanism suspended from an arm supported on said column and extending over one of said supports; and means to index said table and vertically move said electrode in a timed sequence.

10. In a radio interference testing device; a base; a column mounted thereon; a sleeve on said column supporting a work table; means on said sleeve to vertically adjust said table thereon; a plurality of radially extending shields on said table; a support arranged on said sleeve from which a plurality of shields extend radially from said column; said shields having insulator holders arranged therebetween; a support fixed to said column; an electrode suspended therefrom and vertically movable to bring it into engagement with an insulator carried by one of said insulator holders; and means to index said table and vertically move said electrode in a timed sequence.

11. In a radio interference testing safety device; a table rotatably supported on a base; a plurality of electrically and radio shielded insulator holders arranged on said table adapted to hold and insulator therein; means to apply a high voltage to a selected insulator including a vertically movable electrode; a light sensitive cell and a source of light disposed on opposite sides of said selected insulator holder disposed in the path of movement of said electrode; a circuit to control the high voltage applying means; said selected insulator preventing light falling on said light sensitive means; means controlled by said light sensitive means to open said circuit when an empty insulator holder is disposed in the path of movement of said electrode; and means to periodically move said electrode vertically to successively present insulators to said electrode.

12. In a radio interference testing device; a light sensitive cell; a source of light; an insulator normally adapted to be disposed therebetween; means to impose a high potential on said insulator; a control circuit for said high potential; a switch in said circuit controllable by said light sensitive cell and said light sensitive cell energized by said source of light being impinged on said cell when no insulator is interposed between them.

13. In a radio interference test machine; a base; a column supported on said base; an indexable work table thereon; a plurality of insulator holders thereon each having an insulator arranged therein; a support on said column; an electrode suspended therefrom and capable of movement toward and away from an insulator mounted in one of said holders disposed beneath said electrode; radially disposed elements on said table cooperating with radially disposed elements supported on said column to shield each insulator holder, said elements adjustable relatively to each other; a test transformer; said electrode and said insulator included in its secondary circuit when said insulator is disposed in the path of movement of said electrode; means to control the energizing of said transformer; a power driven transmission to index said table, to vertically move said electrode in timed relation thereto and to control the energization of said transformer in timed relation to said indexing and said vertical movement of said electrode and means to measure the radio interference voltage of said insulator including means to determine whether it is high or low.

14. In an insulator testing machine; a base element; a column supported on said base; a table mounted on said column and adapted to be vertically adjusted thereon; means on said column for suspending an electrode above said table; said table having a plurality of insulator holders thereon each having an insulator therein; a prime mover on said base; a shaft driven by said prime mover; means to index said table driven from said prime mover; means actuated by said prime mover and connected to the shaft to open and close a circuit to apply a high voltage to said insulator; means driven by said prime mover to close said circuit; and a light sensitive means which is activated when one of said work holders is presented empty under said electrode controlling a switch to open said circuit.

15. In an insulator testing machine; a base; a column mounted thereon; a table mounted on said column; means to vertically adjust the table on said column; a plurality of spaced insulator holders on said table; each of said holders receiving an insulator; means on said column from which to suspend an electrode adapted to selectively engage said insulators; means to reciprocate said electrode and to index said table in a timed relation; resilient means on said electrode suspending means to press said electrode on said insulator and spring means in said electrodes to fit same to various insulators.

16. In an insulator testing machine; a base; a column on said base; a vertically adjustable indexable table on said base; a plurality of spaced insulator holders on said table each having an insulator therein; a reciprocable insulator electrode mounted on said column; means to index said table and reciprocate said electrode in timed relation; means to resiliently apply said electrode to said insulator when it is reciprocated towards an insulator and resilient means in said electrode to directly engage said insulator.

17. In an insulator testing machine; a base element; a column mounted thereon; a vertically adjustable indexable table on said column having a plurality of test piece holders thereon each having a test piece therein; radially disposed adjustable baffle elements on said column and table to segregate each of said test piece holders; an electrode adapted for reciprocation mounted on said column; power operated means to index said table and reciprocate said electrode in timed relation; a high potential test circuit for said test piece including said electrode which is adapted to be applied to said test piece; switch means operable by said power means to close said circuit; a light sensitive controlled means acting to open said circuit when an empty holder is presented to said electrode.

18. In an insulator testing machine; a base; a column supported on said base; a vertically adjustable indexable table mounted on said column; a plurality of test piece holders on said table; an electrode suspended from a tiltable support on said column; means to reciprocate said electrode and index said table in a timed relation; a test circuit including a test piece under test and a pair of switches; a cam operated by said means in timed relation therewith including a device for closing the first of said pair of switches; a light sensitive means to open the second of said pair of switches when an empty test piece holder is presented under said electrode; and a second device on said cam operable in timed relation therewith to open the first of said pair of switches.

19. In an insulator testing machine; a base; a column supported on said base and having a vertically adjustable indexable table thereon; a plurality of test piece holders thereon each having a test piece therein; a baffle element separating each test piece holder; a vertically movable electrode supported from said column and adapted to be disposed above a selected test piece holder; a test circuit including test piece and holder disposed in a path of movement of said electrode; a cam having a pair of switch operating devices thereon; means to index said table, reciprocate said electrode and operate said cam in timed relation; one of said devices adapted to close said circuit and the other of said devices adapted to open said circuit and other means to open said circuit when an empty test piece holder is presented in the path of movement of said electrode.

20. In an insulator testing machine, an indexable work table having a plurality of spaced work holders thereon; means to successively present each work holder to a source of high potential; means to electrically isolate each work holder and its work piece under test; a high potential test circuit which includes an electrode movable toward and away from a selected work holder disposed in the path of movement of said electrode and engageable with its work piece; means to control said high potential circuit; and means to prevent the energizing of said high potential circuit when an empty work holder is presented in the path of movement of said electrode, said means including a photo-electric cell and a light source disposed on opposite sides of the particular work holder in the path of movement of said electrode, the work piece in said particular holder normally interrupting the light source, said light source activating said cell when said particular work holder is empty, thereby allowing said light source to impinge on said cell and interrupt said high potential circuit.

21. In a testing machine for transmission line insulators; an indexable table having a plurality of insulator holders thereon; an electrode disposed in the path of said insulator holders and vertically movable with respect to an insulator held in one of said holders when it is stationed below said electrode; a high voltage test circuit including said electrode and an insulator in the holder disposed in the path of said vertically movable electrode; means to energize said high voltage circuit including a switch; means to bring an insulator and said electrode into contact after said insulator and its holder are stationed in alignment with said electrode; means to close said switch to energize said high potential circuit; and means to re-open said circuit when an empty insulator holder is disposed in the path of said electrode which includes a photo-electric cell and a source of light disposed in the path of said electrode, said light source energizing said cell when no insulator is present in the particular holder, thereby opening said switch to de-energize said high potential circuit.

WILLIAM A. SMITH.
CHARLES J. MILLER, Jr.